United States Patent [19]

Nagatomo et al.

[11] Patent Number: 4,751,779
[45] Date of Patent: Jun. 21, 1988

[54] METHOD OF PRODUCING A CORE FOR MAGNETIC HEAD

[75] Inventors: Shohei Nagatomo, Itami; Mikio Takai, Takarazuka; Hideto Sandaiji, Kasugai; Soji Ohara, Kashihara, all of Japan

[73] Assignees: DS Scanner Co., Ltd.; NGK Insulators, Ltd., both of Japan

[21] Appl. No.: 31,768

[22] Filed: Mar. 30, 1987

[30] Foreign Application Priority Data

Apr. 2, 1986 [JP] Japan ................................. 61-75888
Feb. 27, 1987 [JP] Japan ................................. 62-45629

[51] Int. Cl.⁴ .............................................. G11B 5/42
[52] U.S. Cl. ................................. 29/603; 156/643; 156/646; 156/667
[58] Field of Search ................. 29/603; 156/643, 646, 156/667, 644

[56] References Cited

U.S. PATENT DOCUMENTS 4,100,584  7/1978  Behr et al. ........................ 29/603 X
4,693,779  9/1987  Okuhira et al. ................ 156/643 X Primary Examiner—Carl E. Hall
Attorney, Agent, or Firm—Parkhurst & Oliff

[57] ABSTRACT

A core for magnetic head, which has a surface roughness of not higher than 2 μm in the side wall of a groove for defining the track width of the core, can be obtained by subjecting at least a portion, which defines the track width, of a gapped bar made of ferrite and having a coil turn hole and a magnetic gap, to a laser-induced etching under a condition that a laser light having a power of 50–1,100 mW and a focused beam diameter of not larger than 20 μm is irradiated to at least the track width-defining portion at a scanning speed of 2–110 μm/sec in a halogen gas- or halide gas-containing atmosphere kept to a gas pressure of 10–200 Torr.

9 Claims, 9 Drawing Sheets

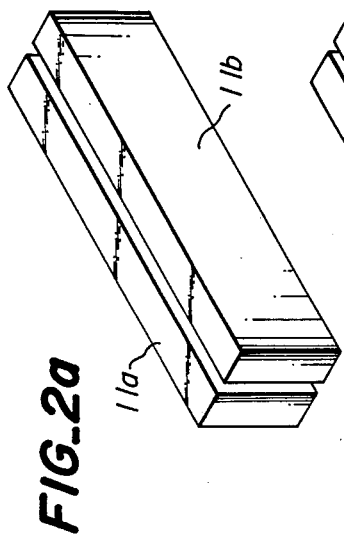
FIG._2a
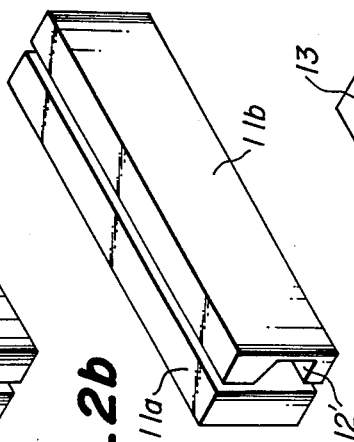
FIG._2b
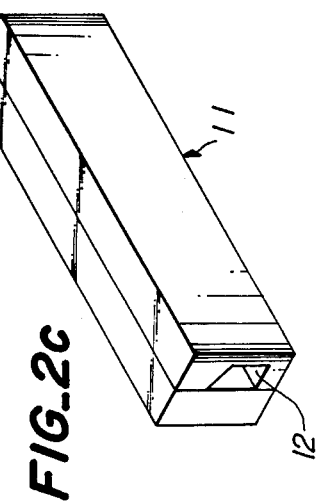
FIG._2c
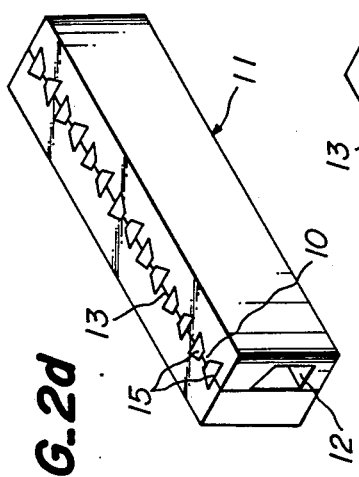
FIG._2d
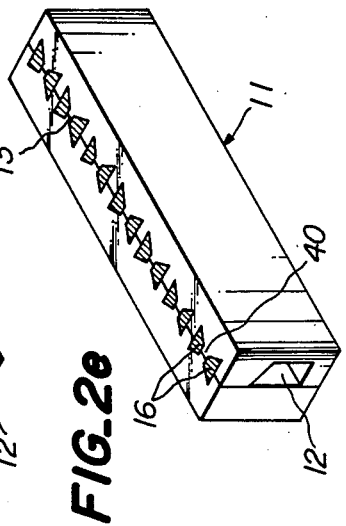
FIG._2e
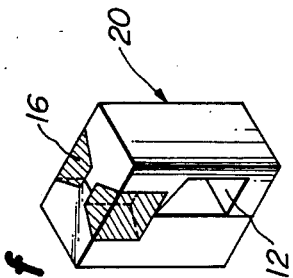
FIG._2f

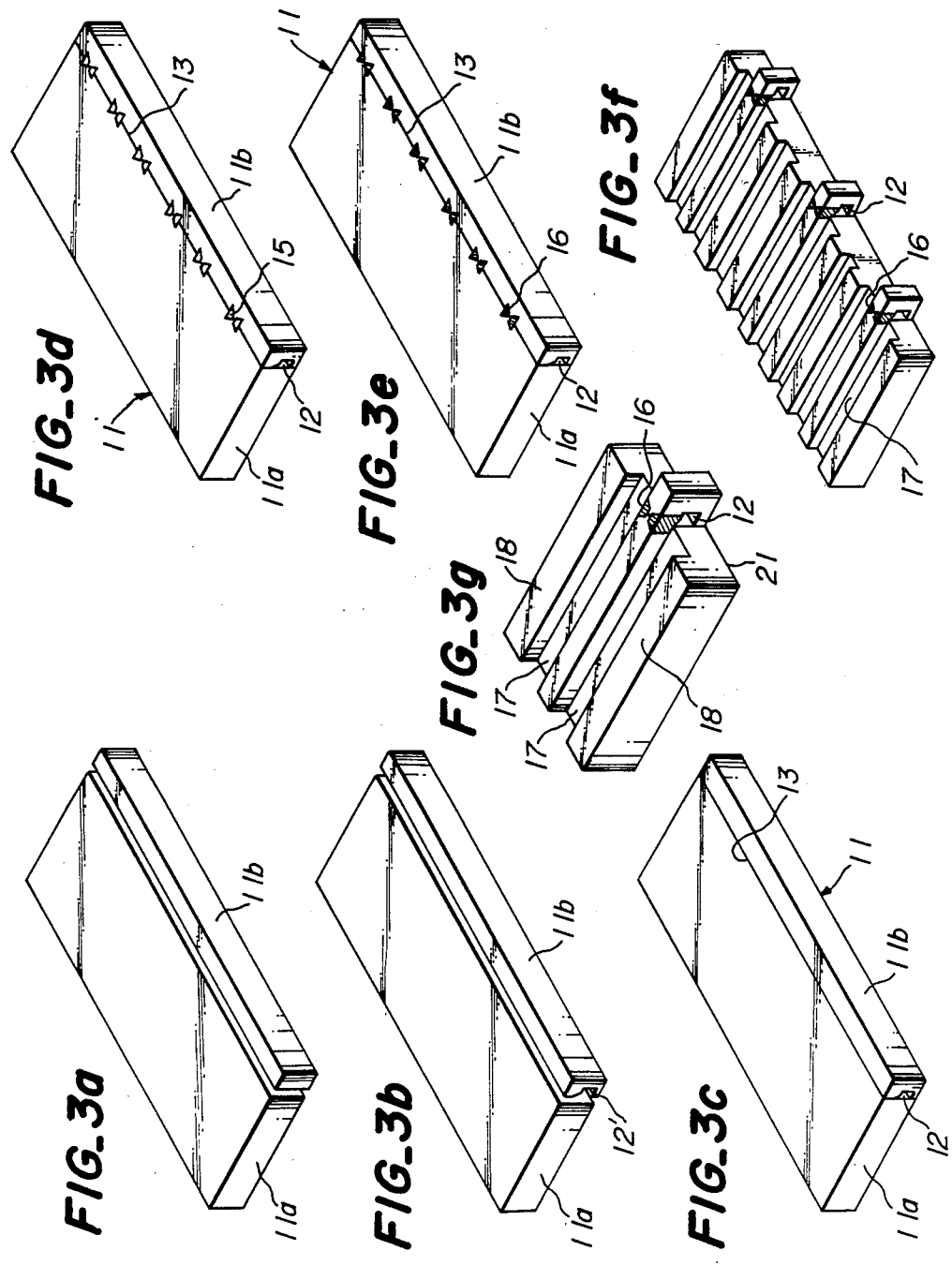

FIG_4a
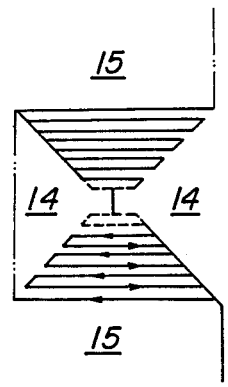
FIG_4b
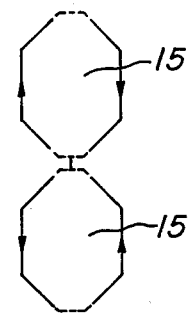
FIG_5
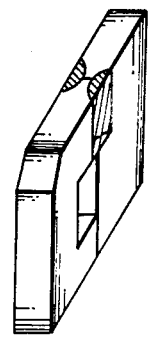

FIG_6a
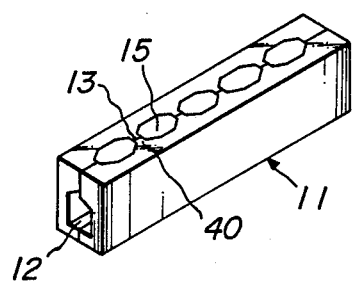
FIG_6b
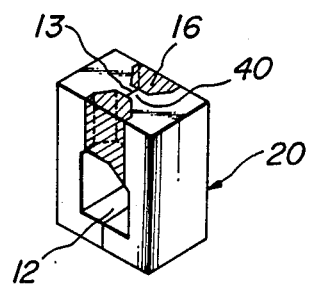

FIG_7
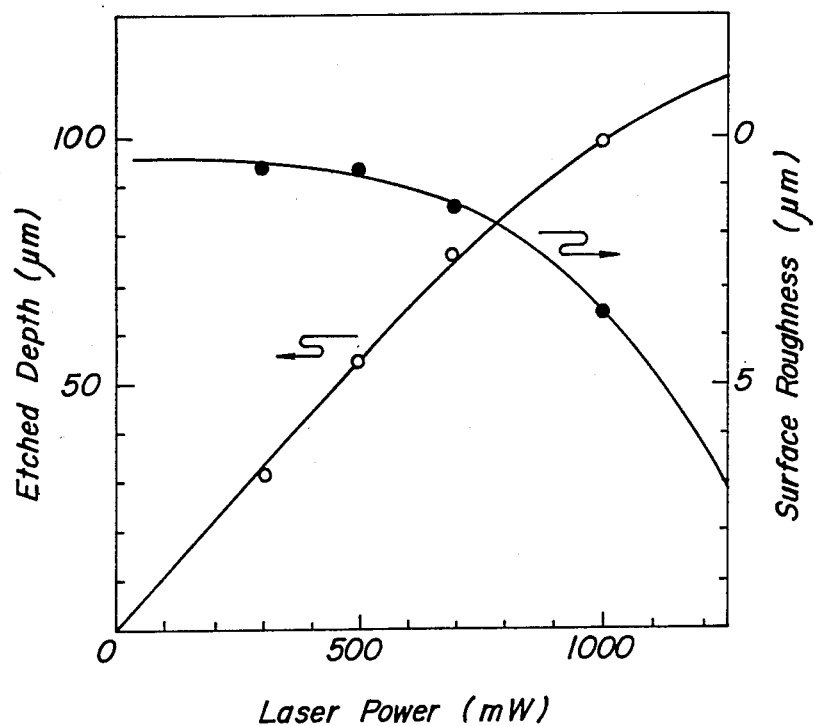

FIG_8
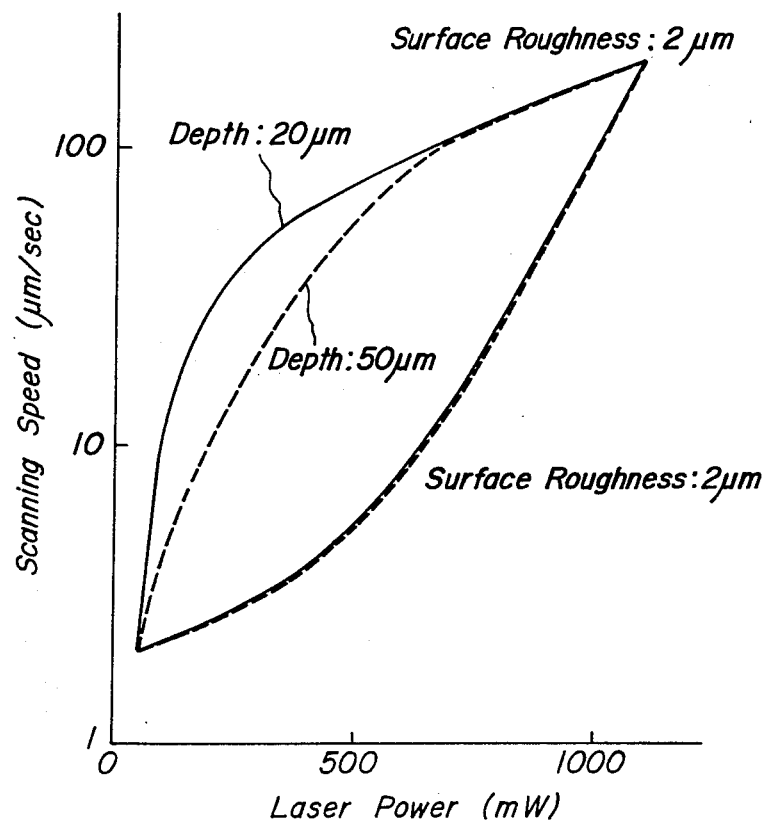

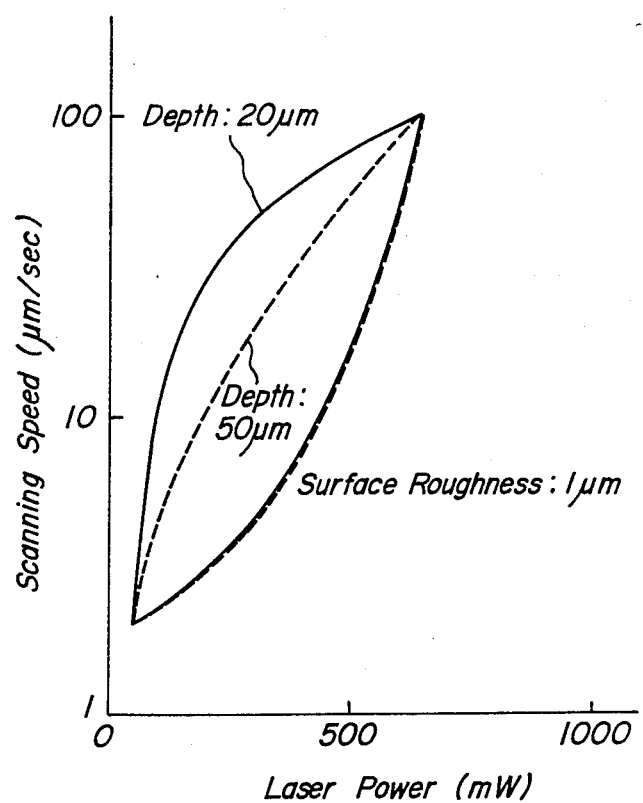
FIG_9

FIG_10
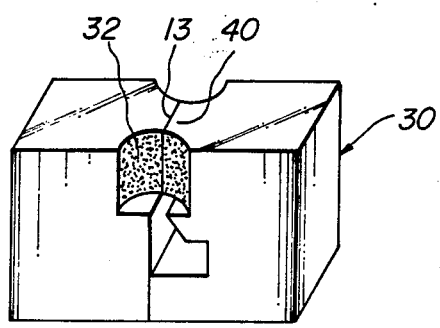
FIG_11
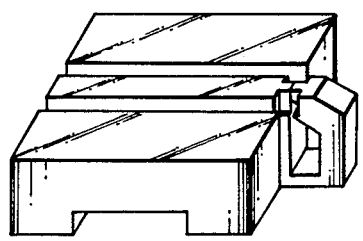

METHOD OF PRODUCING A CORE FOR MAGNETIC HEAD

BACKGROUND OF THE INVENTION

1. Field of the Invention

The present invention relates to a method of producing a core for magnetic head, and more particularly relates to a method of producing a narrow-track core for magnetic head by a laser-induced etching, which induces a chemical reaction by a laser light.

2. Description of the Related Art

There have been disclosed methods for forming a track portion of a core for magnetic head by a laser machining in Japanese patent Laid-open application Nos. 29,118/76, 212,617/82 and the like. Japanese patent Laid-open application No. 29,118/76 discloses a method, wherein a core having a width somewhat larger than the track width is formed, and both sides of the magnetic gap portion of the core is eliminated by a laser machining to define the track width. However, in this method, the machining proceeds through a mechanism, wherein a substance to be eliminated is heated, melted, evaporated and removed by a laser light, and therefore the machined surface has a processing strain due to the heat, accompanied with the formation of microcracks on the surface, and the resulting magnetic head has poor magnetic properties. Moreover, in this method, a melted substance to be eliminated is solidified and adhered to the machined surface and the vicinity thereof as illustrated in FIG. 10 to deteriorate the surface roughness of the machined surface and to cause ununiform thermal diffusion, and hence more than ±5 $\mu$m of scattering is caused in the machined amount and the dimensional accuracy of the resulting track width is poor.

In order to obviate this drawback, Japanese patent Laid-open application No. 212,617/82 discloses a method, wherein unnecessary portion is first eliminated by a laser light having a high power density, and then a finishing machining is carried out by a laser light having a low power density in the above described method. This machining method can somewhat obviate such drawbacks that the melted substance to be eliminated is adhered to the machined surface and the vicinity thereof, and the dimensional accuracy of the resulting track width is poor due to the scattering of the machined amount caused by the ununiform thermal diffusion. However, in the use of a laser light having a low power density, the amount to be eliminated per one time of machining is as small as 5-10 $\mu$m, and hence when a machined depth more than 5-10 $\mu$m is required, the laser light must be repeatedly scanned, and a long machining time is required. Further, the elimination of a substance to be eliminated proceeds through a mechanism of melting and evaporation as proceeds in the above described method, and hence processing strain, microcracks and the like due to heat are formed on the machined surface, resulting in the deterioration of the properties of the resulting magnetic head. Moreover, in both of the above described methods, a core having already a predetermined core width is subjected to a track-forming machining, and therefore grooves formed on both sides of a track cannot be filled with glass in a commercial scale in order to protect the track after the track is formed. As the result, when the magnetic head is slid on a recording medium, such as magnetic tape, magnetic disc or the like, the track of the magnetic head is often broken, and the magnetic head is poor in reliability. In order to obviate these drawbacks, Japanese patent Laid-open application No. 260,408/86 discloses a method, wherein a so-called gapped bar, which has a large length and can produce a plural number of cores, is subjected to the above described laser machining to eliminate unnecessary portions and to form grooves or holes, whereby a plural number of tracks corresponding to the number of cores to be produced are formed and the eliminated portion is filled with glass to protect the track, and then the gapped bar is cut into a plural number of cores. However, in this case, when the gapped bar is subjected to the laser machining, heat is not uniformly diffused into the gapped bar as is uniformly diffused into a thin sheet-like core in the laser machining, and cracks are formed in the track portion. Accordingly, this method cannot be carried out in a commercial scale.

Japanese patent Laid-open application Nos. 82,780/80, 125,677/83 and 82,289/85 disclose methods, which belong to a technical field different from the machining for the production of magnetic head, and wherein a laser light is irradiated to ceramics or metal under a halogen gas or halide gas atmosphere to etch the ceramics or metal by a laser-induced etching. However, all of these three methods do not satisfy the requirements in order to obtain a high accuracy necessary for the production of magnetic head.

For example, Japanese patent Laid-open application No. 82,780/80 discloses the use of pulse laser. However, pulse laser has instantaneously a very high power, and therefore a substance to be eliminated is melted concurrently with the laser-induced etching of the substance, and processing strain, microcracks and the like due to the heat are formed in the remaining portion, resulting in the deterioration of the properties of the resulting magnetic head.

In the method disclosed in Japanese patent Laid-open application No. 125,677/83 also, a laser light having a fairly high power (0.5-1 KW) is used, and hence the above described drawbacks cannot be obviated.

Japanese patent Laid-open application No. 82,289/85 does not at all disclose the power of laser light, the gas pressure and the like, which are requirements necessary for obtaining a predetermined surface roughness. Therefore, in this method, machining of ferrite in a satisfactorily high accuracy is not able to be carried out.

SUMMARY OF THE INVENTION

The object of the present invention is to obviate the drawbacks of the above described conventional methods and to provide a method, wherein a gapped bar is subjected to a laser-induced etching to produce inexpensively a core for magnetic head, which has an excellent surface roughness in the recess, which forms the track, and has a high reliability.

The feature of the present invention lies in a method of producing a core for magnetic head, wherein a gapped bar made of ferrite and having a coil turn hole and a magnetic gap is subjected to a laser machining to form a track, the improvement comprising subjecting at least a portion, which defines the track width, of the gapped bar to a laser-induced etching under a condition that a laser light having a power of 50-1,100 mW and a focused beam diameter of not larger than 20 $\mu$m is irradiated to at least the track width-defining portion at a scanning speed of 2-110 $\mu$m/sec in a halogen gas- or halide gas-containing atmosphere kept to a gas pressure of 10–200 Torr, to form a groove having a surface roughness of not larger than 2 μm in the side wall for defining the track width.

BRIEF DESCRIPTION OF THE DRAWINGS

FIGS. 2a–2f show a flow diagram illustrating the procedure in the case where the present invention is applied to the production of a core for VTR magnetic head;

FIGS. 3a–3g show a flow diagram illustrating the procedure in the case where the present invention is applied to the production of a core for monolithic RDD head;

FIGS. 4a and 4b are diagrammatic views, each illustrating the cross-sectional shape of a portion to be etched off and the scanning pattern of laser light;

FIG. 5 is a diagrammatic view of a core for composite RDD head, which is produced according to the present invention;

FIGS. 6a and 6b are diagrammatic views illustrating another example of the core of the present invention;

FIG. 7 is a graph illustrating a relation between the laser power and the surface roughness or etched depth;

FIG. 8 is a graph illustrating the etching condition range in the case where the surface roughness is set to 2 μm;

FIG. 9 is a graph illustrating the etching condition range in the case where the surface roughness is set to 1 μm;

FIGS. 10 and 11 are diagrammatic views illustrating conventional cores for magnetic head.

DESCRIPTION OF THE PREFERRED EMBODIMENT

Figure 1:
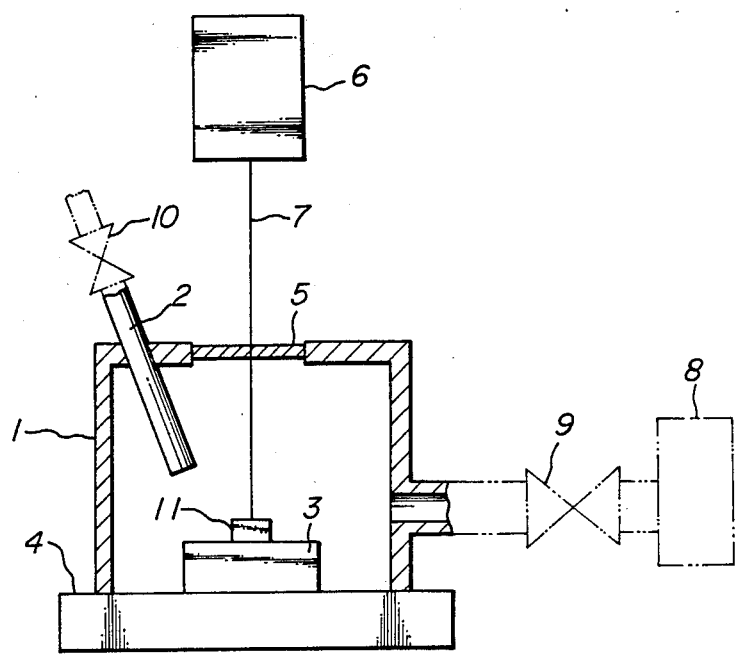
FIG. 1 is a diagrammatic view of one embodiment of apparatuses to be used for carrying out the present invention.

In the present invention, a chemical reaction of ferrite with gas, which occurs in the case where a laser light is irradiated to the ferrite under a halogen gas or halide gas atmosphere, is utilized to etch the ferrite and to form a groove or hole therein (hereinafter, this etching is called as "laser-induced etching"). The present invention has solved drawbacks, such as change of properties of ferrite, formation of cracks and the like, due to the melting and evaporation of ferrite, in the conventional laser machining.

The gapped bar to be used in the present invention is formed by arranging face to face a ferrite bar member having a cross-sectional shape like the letter C and one of a ferrite bar member having a cross-sectional shape like the letter C and a ferrite bar member having a rectangular cross-sectional shape, and has a gap at the face to face portion of the bar members.

When a track is formed in the gapped bar, it is necessary that a groove or hole, which serves to form the track, must be penetrated up to a coil turn hole. The distance from the slidably contacting surface of the finally obtained magnetic head with a recording medium to the coil turn hole of the magnetic head, that is, the gap depth of the finally obtained magnetic head, depends upon the kind of magnetic head, and is generally 30–50 μm in the magnetic head for VTR picture, 2–20 μm in the magnetic head for rigid magnetic disc drive (RDD), and 30–50 μm in the magnetic head for floppy disc drive.

The depth of groove or hole to be formed in order to form a track must be larger than the gap depth of the finally obtained magnetic head, when the filling of glass in the groove or hole and the abrasion processing of the sliding surface of the head, which are carried out in the later steps, are taken into consideration. That is, the depth of the groove or hole must be larger by at least 10 μm, preferably at least 20 μm, than the gap depth of the finally obtained magnetic head. Therefore, in the production of a track by the laser-induced etching, it is necessary to form a groove or hole having a depth of at least 20 μm, preferably a depth of 50 μm.

The side wall of groove or hole, which is formed in order to form a track, defines the track width. Therefore, the unevenness, that is, the surface roughness, of the side wall has a direct influence upon the dimensional accuracy of the track width. It is natural that a side wall having the smaller surface roughness is more effective for obtaining the higher dimensional accuracy of the track width. Accordingly, in order to use the laser-induced etching method to the production of the track of magnetic head, it is necessary that the surface roughness of the side wall of the groove or hole for forming the track is not larger than 2 μm. When the surface roughness of the side wall of the track-forming groove or hole is limited to not larger than 1 μm, the laser-induced etching method of the present invention can be applied to the production of a track of any kinds of magnetic heads.

In the present invention, the surface roughness of the side wall of a groove or hole and the etched depth depend upon the laser power and the scanning speed of laser light. According to the experimental data, when the scanning speed and the laser power are within a certain range, as the scanning speed is the lower, or as the laser power is the higher, the etched depth is the larger. However, when the scanning speed is excessively high, a satisfactory chemical reaction does not occur. When the laser power is excessively high, melting and evaporation of ferrite occur predominantly due to heat rather than due to chemical reaction, and microcracks are formed and melted ferrite is adhered to the etched portion, and the surface roughness is deteriorated. When the laser power is lower than 50 mW, a commercially effectively large amount of laser-induced etching cannot be carried out. Moreover, in order to carry out the laser-induced etching in a commercial scale, it is desirable that the etching time per one track is within 30 seconds in order to carry out the etching method of the present invention more effectively than the conventional mechanical processing method. In the present invention, an area extending at least 10 μm on both sides of a gap is required as a portion, which defines the track width and must be produced in a high dimensional accuracy without causing processing strain. Therefore, at least 2 μm/sec of scanning speed is necessary in order to form this track width-defining portion together with a portion, which is other than the track width-defining portion and is necessary for forming the track portion, within 30 seconds through etching.

A condition capable of attaining an etched depth of at least 20 μm, which is required in an ordinarily used core for magnetic head, in a commercially available high etching speed while maintaining a surface roughness of not larger than 2 μm, lies within the range that the laser power is 50–1,100 mW and a scanning speed is 2–110 μm, and further when the laser power is set to a certain value within the above described range, the lower limit value of the scanning speed is determined depending upon the surface roughness, and the upper limit value of the scanning speed lies within the range determined by the etched depth and the surface roughness (refer to FIG. 8 explained later). Further, in order to attain an etched depth of at least 20 μm while maintaining the surface roughness of not larger than 1 μm, a laser power within the range of 50–650 mW and a scanning speed within the range of 2–100 μm/sec are necessary, and further when the laser power is set to a certain value within the above described range, the lower limit value of the scanning speed is determined depending upon the surface rough-ness, and the upper limit value of the scanning speed lies within the range determined by the etched depth and the surface roughness (refer to FIG. 9 explained later).

In the laser-induced etching method of the present invention, the gas to be used as the atmosphere is preferred to be a substance capable being formed into a compound, which volatilizes stably into the atmosphere, by the chemical reaction of the gas with a ferrite to be etched off. Iron, which is a main component of ferrite, reacts with halogen element to form a compound having a relatively high vapor pressure. Accordingly, a halogen gas- or halide gas-containing gas is suitable to be used as the atmosphere gas. Among the halogen gas- and halide gas-containing gases, $CCl_4$ is advantageously used. Because, $CCl_4$ can be easily handled due to its stability and relatively low toxicity.

In order to remove effectively the etched ferrite, it is necessary to remove rapidly gas of halide of the element constituting the ferrite, which halide is formed as a chemical reaction product, from the etched portion and at the same time to supply to the etching portion a fresh halogen gas- or halide gas-containing gas in an amount enough to carry out successively the chemical reaction. Accordingly, the vacuum degree of the atmosphere, that is, the pressure of halogen gas- or halide gas-containing gas must be controlled to a proper range. When the gas pressure is higher than 200 Torr, gas or halide, which is formed as a chemical reaction product of halogen with the ferrite-constituting element, is difficult to be volatilized and is adhered to the etched surface and the vicinity thereof, resulting in a large surface roughness. Although the surface roughness of the etched surface depends upon the amount of etched ferrite and the shape of the groove or hole, when it is intended to form a hole having a width of 3 μm and a depth of 50 μm, if the gas pressure is less than 10 Torr, the etched surface has a processing strain similarly to the case of conventional laser machining. Accordingly, the gas pressure of halogen gas- or halide gas-containing gas should be set to 10–200 Torr, preferably 40–100 Torr.

It is not always necessary to close tightly the atmosphere during the etching, and it is effective to pass a gas during the etching. As one of the methods for passing a gas, a method, wherein halogen gas- or halide gas-containing gas is forcedly supplied through a nozzle to the vicinity of etching portion, is effective in order to remove the reaction product and to supply a fresh gas. Further, it is effective from the economical view point that the above described laser-induced etching is carried out at room temperature. The etching can also be carried out by a method, wherein a gapped bar is heated below 500° C. and is etched by a weak laser power.

When the focused diameter of laser beam is not larger than 20 μm, an aimed surface roughness and etched depth can be obtained. However, the focused laser beam diameter has an influence upon the removal of the etched ferrite at the etched portion, and therefore the focused laser beam diameter, the above described gas pressure, and the temperature of ferrite to be etched off must be somewhat taken into consideration in the selection of etching condition. The wavelength of laser light should be not larger than 20 μm in principle in order to attain the object of the present invention when the relation between the wavelength of laser light and the above described focused beam diameter thereof is taken into consideration. The wavelength is properly selected within the range of not larger than 20 μm by taking the ability of lens and other conditions into consideration. As the laser source satisfying the above described conditions, there can be used various lasers of YAG, $CO_2$, Ar ion and the like. Among them, Ar ion laser is preferably used due to the high oscillation stability and to the small diverging angle of laser light.

In the etching of the track width-defining portion, a high accuracy and a low processing strain are demanded. However, in the portion other than the track width-defining portion, the high accuracy and low processing strain are not so strictly demanded in almost all cases. Accordingly, it is advantageous from the viewpoint of shortening of etching time to etch the portion other than the track width-defining portion at a relatively high speed before or after the etching of the track width-defining portion.

The machining of the portion other than the track width-defining portion is a so-called drilling. Therefore, laser machining, ultrasonic machining, discharge machining and the like in the air are used depending upon the purpose. In addition, a portion other than the track width-defining portion can be eliminated by irradiating a laser light to the portion in an etching solution containing acid, such as phosphoric acid or the like, or containing alkali, such as potassium hydroxide or the like. However, the machining of the portion other than the track width-defining portion is advantageously carried out by the laser-induced etching method in a halogen gas- or halide gas-containing gas similarly to the etching off of the track width-defining portion.

In this case, it is necessary to use a high laser power and a high laser beam scanning speed in order to carry out the etching in a high speed. As described above, in order to carry out the laser-induced etching in a commercial scale, it is desirable that the etching is carried out within 30 seconds per one track. Accordingly, it is necessary to etch a portion other than the track width-defining portion at a scanning speed of at least 100 μm/sec. In this portion, the etching can be carried out in an accuracy of about ±20 μm, preferably about ±10 μm in order to attain the object of the present invention, and therefore when a groove or hole has a surface roughness of not larger than 20 μm, preferably not larger than 10 μm, in its side wall in the portion other than the track-width defining portion, the object of the present invention can be attained. Further, a high processing strain may be caused in the portion other than the track width-defining portion insofar as the strain does not adversely influence upon the properties of the resulting magnetic head, and therefore a laser power of 1,500 mW at the maximum can be used. However, when the laser power is less than 700 mW, an etched depth of 20 μm cannot be obtained by a scanning speed of 100

μm/sec. Accordingly, it is desirable to use a laser power of 700–1,500 mW. While, when the scanning speed is higher than 700 μm/sec, an etched depth of 20 μm cannot be obtained by a laser power of 1,500 mW. Therefore, it is desirable to use a scanning speed of 100–700 μm/sec. Further, in order to form a groove or hole having a surface roughness of not larger than 10 μm in its side wall, it is desirable to use a laser power of 700–1,000 mW and a scanning speed of 100–350 μm/sec.

A method, wherein a high laser power and a high scanning speed are used in order to shorten the etching time in the portion other than the track-width defining portion, has been described above. However, when it is not necessary to shorten the etching time, it is most advantageous in view of surface roughness and processing strain that the portion other than the track width-defining portion is etched under the same condition as that in the track width-defining portion.

There has been explained in this specification with respect to a method, wherein whole (whole portion to be etched off) of the track width-defining portion and the portion other than the track width-defining portion is irradiated with a laser light, and is removed by the chemical reaction to form a track. Further, a track can be formed by a method, wherein a gapped bar having a coil turn hole, which extends to both sides of the magnetic gap and has a width equal to or somewhat larger than the width of the portion to be eliminated is used, and a laser light is scanned only on the profile of the portion to be removed to form a groove, which penetrates up to the coil turn hole, by the chemical reaction, and then the portion to be removed is scooped out. According to this method, the etching time can be further shortened.

In the above described etching also, it is of course desirable to select such an etching condition that a low laser power and a low scanning speed are used in the etching of the track width-defining portion, and a high laser power and a high scanning speed are used in the etching of the portion other than the track width-defining portion.

The present invention will be explained in more detail referring to the accompanying drawings.

I Apparatus

FIG. 1 illustrates one embodiment of an apparatus used for carrying out the present invention. A chamber 1 arranged on an X-Y stage 4 is directly connected to a vacuum pump 8 through a valve 9. A nozzle 2 extending into the interior of the chamber 1 and being opened thereinto is connected to at least one kind of gas sources of gases containing halogen or halide through a valve 10. Further, the chamber 1 is provided at its upper wall with a quartz window 5, and a laser light 7 emitted from a laser light source 6 arranged above the quartz window 5 is irradiated into the chamber 1 through the quartz window 5. A gapped bar 11 to be subjected to an etching is arranged on a sampling holder 3 placed in the chamber 1, and the gapped bar 11 is subjected to a laser-induced etching by the following means and under the following condition.

That is, the vacuum pump 8 is first actuated to make the interior of the chamber 1 vacuum, and then the valve 10 is opened to fill the chamber 1 with $CCl_4$ gas kept to a predetermined pressure. The $CCl_4$ gas has a vapor pressure of about 60 Torr at room temperature. Accordingly, in the present invention, the gas pressure in the chamber 1 filled with $CCl_4$ is kept to a pressure corresponding to the vapor pressure of $CCl_4$. Then, an Ar ion laser beam having a wavelength of 514.5 nm and a focused beam diameter of 2.5 μm is irradiated to the surface of the gapped bar 11, and at the same time the gapped bar 11 is moved by means of the X-Y stage 4 according to the predetermined scanning pattern to cause a chemical reaction at the predetermined position.

II Gapped bar

In the present invention, various ferrites, such as Mn-Zn ferrite, Ni-Zn ferrite and the like, can be used as the gapped bar. The ferrites may be single crystal ferrite or polycrystal ferrite, and further may be a composite ferrite consisting of both single crystal ferrite and polycrystal ferrite.

A core for magnetic head is produced by using such ferrite along the procedures illustrated in FIGS. 2a–2f or 3a–3g.

That is, a groove 12', which corresponds to a coil turn hole, is formed in one of a pair of the bar members 11a and 11b, each having a rectangular cross-sectional shape, and the bar members 11a and 11b are placed face to face with other, and at the same time a magnetic gap 13 having a predetermined gap (width) is formed at the face to face portion of both the bar members, whereby a gapped bar 11 having a coil turn hole 12 is produced. The formation of the groove 12' for coil turn hole, the formation of the magnetic gap, and the bonding of the bar members 11a with 11b can be carried out by commonly known methods. For example, the bar members 11a and 11b can be bonded with each other by the use of glass or through a solid phase reaction.

In the present invention, it is effective for improving the machining speed as explained specifically in the following example to use a gapped bar 11 as illustrated in FIG. 6a, which consists of two ferrite bar members 11a and 11b bonded with each other, each bar member having a groove 12' for forming a coil turn hole at the bonding surface of both the members after they are bonded, and has a coil turn hole 12 formed by the bonding of the bar members, extending to both sides of the magnetic gap 13 and having a width equal to or somewhat larger than the width of the portion to be eliminated.

III Etching procedure

The outline of the etching procedure for producing a core for VTR magnetic head in the present invention will be explained according to FIGS. 2a–2f. A laser beam having a predetermined power is irradiated to a portion 14, which is crossed to the magnetic gap 13 of the gapped bar 11 formed as described above and defines the track width, at a predetermined scanning speed to etch off the portion 14 by the laser-induced etching method. Thereafter or prior to the laser-induced etching, a portion 14, which defines the track width, of a portion 15 to be etched is etched off by a laser beam having a power higher than that of the above described laser beam at a relatively higher scanning speed to form a plural number of track portions 40. A concrete method of this etching procedure will be explained later in detail.

Glass 16 as a non-magnetic material is placed on the gapped bar 11 which has a track portion 40, and heated and melted to fill the glass in the grooves 15. Finally, aimed cores 20 having a predetermined width and a predetermined azimuth angle are cut out from the gapped bar 11.

The resulting core 20 for magnetic head is completely free from the adhesion of melted ferrite and the formation of cracks at the side surface 32 of the recesses formed on both sides of the track portion 40 contrary to a core 30 for magnetic head produced by a conventional method. Moreover, the glass 16 is filled in the recesses formed on both sides of the track portion 40 in order to protect the track portion, and therefore the track portion 40 has a high mechanical strength, and the core of the present invention is remarkably superior in reliability to conventional core 30 for magnetic head.

One embodiment of the apparatus to be used in the present invention and one embodiment of the production method of the core for magnetic head having magnetic gap have been explained. However, it will of course be apparent that the present invention is not limited to these embodiments, and many variations, modifications and improvements can be made by those skilled in the art without departing from the scope of the present invention.

A method for applying the laser-induced etching method to the production of the track of a core for VTR head has been explained in this specification. However, the present invention should not be limited to the above described method, but can be advantageously used in the machining for the production of a track of cores for FDD magnetic head and monolithic or composite RDD magnetic head, and further in the machining for the formation of a groove for forming a floating surface in the core for RDD magnetic head, and in the machining for the production of various ferrite articles.

EXAMPLE (1) Determination of etching condition:

The etching condition in the case where the above described gapped bar is etched according to the present invention by means of the above described apparatus will be explained hereinafter. FIG. 7 illustrates a relation between the laser power and the surface roughness (mark ●) and a relation between the laser power and the etched depth (mark ○) in the case where an Ar ion laser beam having a focused beam diameter of 2.5 $\mu$m is scanned at a scanning speed of 30 $\mu$m/sec under a $CCl_4$ gas pressure of 60 Torr. It can be seen from FIG. 7 that a laser power within the range of 200-800 mW is proper in order to attain an etched depth of at least 20 $\mu$m and a surface roughness of not larger than 2 $\mu$m. As illustrated in FIG. 7, both the etched depth and the surface roughness depend upon the laser power. Moreover, it can be naturally anticipated that both the etched depth and the surface roughness depend upon the scanning speed also. Accordingly, the present invention should be evaluated predominantly based on the mutual relation of 4 factors of laser power, etching speed (scanning speed), etched depth and surface roughness.

FIG. 8 illustrates a more preferable condition range for carrying out an etching of the gapped bar in order to obtain a surface roughness of not larger than 2 $\mu$m, and an etched depth of at least 20 $\mu$m (solid line) or at least 50 $\mu$m (broken line).

It can be understood from FIG. 8 that the condition necessary for obtaining a surface roughness of not larger than 2 $\mu$m and an etched depth of at least 20 $\mu$m or at least 50 $\mu$m lies within the range of a laser power of 50-1,100 mW and a scanning speed of 2-110 $\mu$m/sec, and further when the laser power is set to a certain value within the above described range, the lower limit value of the scanning speed is limited by the surface roughness, and the upper limit value thereof lies within the range defined by the etched depth and the surface roughness.

For example, when the laser power is 300 mW and the scanning speed is lower than about 3 $\mu$m/sec a surface roughness of not larger than 2 $\mu$m can not be obtained; while when the laser power is 300 mW and the scanning speed is higher than about 45 $\mu$m/sec, an etched depth of not less than 20 $\mu$m can not be obtained. Further, it can be seen from FIG. 8 that, when the laser power is 300 mW and the scanning speed lies within the range of 20-45 $\mu$m/sec, an etched depth of 20-50 $\mu$m can be obtained while maintaining a surface roughness of not larger than 2 $\mu$m; and when the laser power is 300 mW and the scanning speed lies within the range of 3-20 $\mu$m, an etched depth of not less than 50 $\mu$m can be obtained while maintaining a surface roughness of not larger than 2 $\mu$m.

Further, FIG. 9 illustrates a more preferable condition range for carrying out an etching of the gapped bar in order to obtain a surface roughness of not larger than 1 $\mu$m and an etched depth of at least 20 $\mu$m (solid line) or at least 50 $\mu$m (broken line).

It can be understood from FIG. 9 that a condition necessary for obtaining a surface roughness of not larger than 1 $\mu$m and an etched depth of at least 20 $\mu$m or at least 50 $\mu$m lies within the range of a laser power of 50-650 mW and a scanning speed of 2-100 $\mu$m/sec, and further when the laser power is set to a certain value within above described range, the lower limit value of the scanning speed is limited by the surface roughness, and the upper limit value thereof lies within the range defined by the etched depth and the surface roughness.

For example, when the laser power is 300 mW and the scanning speed is lower than about 4 $\mu$m/sec, a surface roughness of not larger than 1 $\mu$m cannot be obtained; while when the laser power is 300 mW and the scanning speed is higher than about 45 $\mu$m/sec, an etched depth of not less than 20 $\mu$m cannot be obtained. Further, it can be seen from FIG. 9 that, when the laser power is 300 mW and the scanning speed lies within the range of 20-45 $\mu$m/sec, an etched depth of 20-50 $\mu$m can be obtained while maintaining a surface roughness of not larger than 1 $\mu$m; while when the laser power is 300 mW and the scanning speed lies within the range of 4-20 $\mu$m/sec, an etched depth of not less than 50 $\mu$m can be obtained while maintaining a surface roughness of not larger than 1 $\mu$m.

The above described conditions are based on the results of an experiment under a condition that the $CCl_4$ gas pressure is 10-200 Torr and the focused laser beam diameter is not larger than 20 $\mu$m. However, the amount of ferrite to be etched off is determined depending upon the quantity of heat given to the etching point and the gas pressure. Therefore, even when the laser power is same, if the focused laser beam diameter is varied, the distribution of the quantity of heat given to the etching point varies, and hence the etched amount varies. Accordingly, a proper condition for obtaining an aimed surface roughness and etched depth should be selected by taking the density of laser power and the gas pressure into consideration within the range illustrated in FIG. 8 or FIG. 9. $CCl_4$ has a vapor pressure of about 60 Torr at room temperature, and therefore the gas pressure is limited within the range of 40–60 Torr from the economical view point insofar as CCl₄ is used. The focused laser beam diameter should be small as possible, and is preferably selected within the range of not larger than 3 μm.

(3) Production of ferrite core:

FIGS. 2a–2f illustrate one of the procedures of producing a core for VTR head in the present invention. A laser light was scanned on a gapped bar made of a single crystal Mn-Zn ferrite according to a zigzag scanning pattern illustrated in FIG. 4a under a condition, which had been selected based on the results of the above described experiments and was shown in the following Table 1, to etch the gapped bar such that two grooves 15 having a trapezoid cross-sectional shape would be symmetrically located on both sides of a track, whereby a plural number of tracks having a width of 30 μm were formed.

TABLE 1

| Condition | Laser wavelength | | Ar ion 514.5 nm | | |
|---|---|---|---|---|---|
| | Gas pressure | | 60 Torr | | |
| | Focused beam diameter | | 2.5 μm | | |
| | Laser power | 400 mW | track-defining portion, | 800 mW | other portion |
| | Scanning speed | 20 μm/sec | | 150 μm/sec | |
| X-Y Stage | Driving system | | DC servo motor | | |
| | Positioning accuracy | | ±0.5 μm | | |

The dimension of each groove was as follows. That is, the trapezoid in the cross-section of the groove had a dimension that the upper base, whose length defined the track width, was extended to both sides of the magnetic gap up to the distance of 50 μm and had a length of 100 μm in total, the lower base had a length of 300 μm, and the height was 100 μm; and the depth of the groove was 50 μm larger than the gap depth which defines the track portion in the resulting core. Then, glass 16 was placed on the gapped bar, and heated in an electric furnace to melt the glass and to fill the glass in the groove which defined the track width-defining portion and other portion. The atmosphere in the furnace was adjusted to substantially the same as the equilibrium oxygen partial pressure of ferrite in order that the magnetic properties of ferrite were not deteriorated due to the reaction of oxygen with ferrite in the furnace. The gapped bar was abraded up to the predetermined gap depth to obtain a core bar.

The resulting core bar was cut into core pieces in a direction inclined at an angle of about 6° with respect to the direction perpendicular to the direction of the gap portion such that the resulting core piece had a width of 200 μm and had the gap portion in its middle. Then, both side surfaces of the core piece were abraded by 35 μm to obtain a core for VTR head. The resulting core for magnetic head was free from the formation of microcracks and the adhesion of melted ferrite on the track portion contrary to the conventional core for magnetic head illustrated in FIG. 10. Moreover, the side surface 32 of the recess forming the track portion 40 was small in the surface roughness, and the dimensional accuracy of the track width was able to be kept within ±2 μm. Furthermore, both sides of the track portion were reinforced with glass, and therefore the resulting core for magnetic head had a high mechanical strength in the track portion and a high abrasion resistance in the sliding surface and hence had a high reliability.

According to the etching method of the present invention, about 90 seconds are required for the production of one track. This production time is about two times that in the conventional mechanical processing by means of a diamond cutter. However, in the etching method of the present invention, the lowering of dimensional accuracy due to the abrasion of grinding wheel does not occur, the filling of track glass can be carried out in one time, and the positioning of tracks, which requires the largest manhours among other steps, is not required. Therefore, in the etching method of the present invention, the manhours can be greatly decreased as a whole.

The cross-sectional shape of the etched-off portion is not limited to the trapezoid illustrated in FIG. 4a, but may be semi-polygon, semi-circle, semi-oval or the like depending upon the use purpose.

The present invention is not limited to the production method of the above described core for VTR head, but can be applied to the production of a core for monolithic RDD head, which is used in a magnetic disc drive and is illustrated, for example, in FIGS. 3a–3g. In this embodiment, a gapped bar, which was formed of single crystal Mn-Zn ferrite, and whose surface constituting the gap was a (100) plane and whose sliding surface with a recording medium was a (110) plane, was irradiated with a laser light on the portions 15 to be etched off, which had the same trapezoid cross-sectional shape as described above, along the zigzag scanning pattern illustrated in FIG. 4a under the same condition as described above to form a plural number of tracks, each having a width of 20 μm, and grooves 15, each groove having a trapezoid cross-sectional shape having an upper base of 100 μm length, a lower base of 300 μm length and a height of 100 μm, and further had a depth 50 μm larger than the gap depth which forms the track portion in the resulting core. Then, the groove was filled with glass 16 in the same manner as described above, and the thus treated gapped bar was abraded up to the predetermined gap depth to obtain a core bar. Then, a groove 17 for forming a floating surface 18 was formed at an interval of 0.4 mm parallel to the track such that the gap portion would be positioned in the middle of the resulting core. Thereafter, a tapered portion having a predetermined angle was formed, then a yoke having a width of 0.4 mm was formed, and then core pieces, each of which had a width of 3.4 mm and had floating surfaces 18, each being 0.75 mm length, were cut out from the above treated core bar. Then, the floating surface and the center rail of the resulting core piece were chamferred to obtain a core for monolithic RDD head.

The resulting core for magnetic head was free from the formation of microcracks and the adhesion of melted ferrite in the track portion contrary to the conventional core for monolithic RDD head illustrated in FIG. 11. Moreover, the track portion were reinforced with glass from both sides, and therefore the track portion had a high mechanical strength. Therefore, the track width can be made into a small width. Moreover, the core had a play back out put power, an overlight property and a crosstalk, which were equal to or superior to those of conventional cores for magnetic head.

Further, in the present invention, when the production method illustrated in FIGS. 2a-2f is used, a core for composite RDD head can be produced. In this case, the track width can be easily made into a small width as illustrated in FIG. 5. In addition, the ratio of the area of exposed glass at the sliding surface can be effectively decreased, and hence the abrasion resistance of the core can be remarkably improved.

When a gapped bar having a cross-sectional shape illustrated in FIG. 6a, which has a coil turn hole formed extending to both sides of the magnetic gap, is used in place of the above described gapped bar illustrated in FIGS. 2a-2f, and a laser light is irradiated to the gapped bar according to the octagonal scanning pattern illustrated in FIG. 4b to form a groove extending up to the coil turn hole, and a profile portion, which surrounds a track width-defining portion and a portion other than the track width-defining portion, is scooped out from the gapped bar to form a track, a core for magnetic head as illustrated in FIG. 6b can be easily obtained. In this example, a gapped bar 11 having a coil turn hole 12 extending to both sides of the magnetic gap was irradiated with the same laser light as described above by scanning the laser light along the profile of an octangular portion 15 to be etched off (in this case, adjacent portions 15 to be etched off are mutually communicated to each other) as illustrated in FIG. 4b to form a plural number of track portions having a track width of 30 μm and octangular holes having an octagonal cross-sectional shape of 100 μm side and having a depth 50 μm larger than the gap depth forming a track portion in the resulting core. Then, the hole was filled with glass 16 in the same manner as described above, and the thus treated gapped bar was abraded up to the predetermined gap depth to obtain a core bar. Then, the core bar was cut into core pieces in a direction inclined at an angle of about 6° with respect to the direction perpendicular to the direction of the gap portion such that the gap portion would be positioned in the middle of the resulting core piece. Then, both side surfaces of the core piece were abraded by 35 μm to obtain a core for VTR head as illustrated in FIG. 6b. In this example, the total scanning distance of laser light is shortened, and the machining time per one track is as short as about 1/5 of the machining time in the above described examples, and is as short as about ⅔ of the processing time required in the conventional mechanical processing. Therefore, in the production of the core illustrated in FIG. 6b, the manhours can be greatly decreased. The cross-sectional shape of the etched portion 15 is not limited to the shape illustrated in FIG. 4b, but may be other shape, such as polygon, circle, oval or the like, depending upon the use purpose. The method illustrated in FIG. 6b is not limited to the production of a core for VTR head, but can be advantageously used for the production of cores for magnetic heads used for RDD, FDD and the like.

As described above, according to the present invention, tracks having a narrow width can be formed on a gapped bar in a high accuracy without causing processing strain nor forming microcracks, and moreover grooves formed on both sides of a track portion can be filled with glass. Therefore, a core for magnetic head, having a high reliability, can be obtained. Furthermore, in the present invention, two ranks of etching condition with respect to surface roughness are selected, and therefore the manhours can be greatly saved, and a core for magnetic head can be inexpensively produced.

What is claimed is:

1. In a method of producing a core for magnetic head, wherein a gapped bar made of ferrite and having a coil turn hole and a magnetic gap is subjected to a laser machining to form a track, the improvement comprising subjecting at least a portion, which defines the track width, of the gapped bar to a laser-induced etching under a condition that a laser light having a power of 50–1,100 mW and a focused beam diameter of not larger than 20 μm is irradiated to at least the track width-defining portion at a scanning speed of 2–110 μm/sec in a halogen gas- or halide gas-containing atmosphere kept to a gas pressure of 10–200 Torr, to form a groove having a surface roughness of not larger than 2 μm in the side wall for defining the track width.

2. A method according to claim 1, wherein the halide gas is carbon tetrachloride.

3. A method according to claim 1, wherein the laser light is Ar ion laser.

4. A method according to claim 1, wherein the portion other than the track width-defining portion is etched by irradiating to the portion a laser light having a power of 700–1,500 mW at a scanning speed of 100–700 μm/sec in the laser-induced etching.

5. A method according to claim 1, wherein the portion other than the track width-defining portion is etched off by irradiating a laser light to the portion in an etching solution containing acid, such as phosphoric acid, or containing alkali, such as potassium hydroxide.

6. A method according to claim 1, wherein the portion other than the track width-defining portion is eliminated by the YAG laser machining in the air, ultrasonic wave machining or discharge machining.

7. A method according to claim 1, wherein a gapped bar having a coil turn hole having a width equal to or somewhat larger than the width of a portion to be etched off is used, which portion is the whole of a track width-defining portion and a portion other than the track width-defining portion.

8. A method according to claim 7, wherein a groove, which penetrates up to the coil turn hole, is formed along the profile of the portion to be etched off, and the portion is scooped out from the gapped bar to form a track.

9. A method according to claim 1, wherein the groove is filled with a non-magnetic material, such as glass, and then the gapped bar is cut into cores having a predetermined width.

* * * * *